United States Patent
Koike et al.

(10) Patent No.: US 11,832,564 B2
(45) Date of Patent: Dec. 5, 2023

(54) BRUSH CUTTER

(71) Applicant: HONDA MOTOR CO., LTD., Tokyo (JP)

(72) Inventors: Yuki Koike, Saitama (JP); Dai Hyakusawa, Saitama (JP); Shingo Tsuruoka, Saitama (JP); Takahiro Nakayama, Saitama (JP); Takahiro Yamamoto, Saitama (JP); Takuma Kimoto, Saitama (JP); Toshiro Uchida, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 39 days.

(21) Appl. No.: 17/043,992

(22) PCT Filed: Mar. 30, 2018

(86) PCT No.: PCT/JP2018/013961
§ 371 (c)(1),
(2) Date: Sep. 30, 2020

(87) PCT Pub. No.: WO2019/187147
PCT Pub. Date: Oct. 3, 2019

(65) Prior Publication Data
US 2021/0029888 A1      Feb. 4, 2021

(51) Int. Cl.
*A01G 3/06*        (2006.01)
*A01D 34/416*   (2006.01)

(52) U.S. Cl.
CPC .......... *A01G 3/062* (2013.01); *A01D 34/416* (2013.01)

(58) Field of Classification Search
CPC ........ A01G 3/06; A01G 3/062; A01D 34/412; A01D 34/416; A01D 34/4161–4168
(Continued)

(56) References Cited

U.S. PATENT DOCUMENTS 3,581,832 A * 6/1971 Heermann ........... A01D 34/905
                                                                  30/388
3,622,142 A * 11/1971 Lorio ........................ F16F 1/13
                                                                  267/287
(Continued)

FOREIGN PATENT DOCUMENTS

EP           2422603 A1    9/2012
JP        S51-123929 U   10/1976
(Continued)

OTHER PUBLICATIONS

Mar. 9, 2021, European Search Report issued for related EP Application No. 18913063.6.
(Continued)

*Primary Examiner* — Adam J Eiseman
*Assistant Examiner* — Richard D Crosby, Jr.
(74) *Attorney, Agent, or Firm* — Paratus Law Group, PLLC

(57) ABSTRACT

This brush cutter includes: a drive unit; a working unit which is driven by power of the drive unit; a shaft which transmits the power of the drive unit to the working unit; a tubular portion which is disposed between the drive unit and the working unit, and in which the shaft is inserted; a floating box which has a handle support portion; and a handle which is supported by the handle support portion. The brush cutter is provided with a vibration absorbing member which fits in a tubular portion side fitting portion provided in the tubular portion and fits in a box side fitting portion provided in the floating box.

9 Claims, 6 Drawing Sheets

(58) Field of Classification Search
USPC .......................................................... 30/276
See application file for complete search history.

(56) References Cited

U.S. PATENT DOCUMENTS

| | | | | |
|---|---|---|---|---|
| 4,135,301 A * | 1/1979 | Hoeppner | ........... | B27B 17/0033 267/137 |
| 4,491,184 A * | 1/1985 | Kawaharazuka | ....... | F16F 7/108 173/162.1 |
| 4,586,322 A * | 5/1986 | Yokocho | .............. | A01D 34/905 30/276 |
| 4,759,128 A * | 7/1988 | Katoh | .................. | A01D 34/905 30/276 |
| 4,819,742 A * | 4/1989 | Driggers | ................. | B25F 5/006 30/276 |
| 4,825,548 A * | 5/1989 | Driggers | ................. | B25F 5/006 30/276 |
| 4,936,394 A * | 6/1990 | Ohtsu | .................... | B24B 23/005 173/162.2 |
| 5,345,684 A * | 9/1994 | Shoup | .................. | A01D 34/416 248/610 |
| 5,361,500 A * | 11/1994 | Naslund | .............. | B27B 17/0033 30/381 |
| 5,368,107 A * | 11/1994 | Taomo | ..................... | B25G 1/01 267/179 |
| 5,375,666 A * | 12/1994 | Pettet | .................... | A01D 34/905 173/162.1 |
| 5,540,291 A * | 7/1996 | Coleman | ................. | H01H 9/06 173/170 |
| 5,692,306 A * | 12/1997 | Stoll | ....................... | B25F 5/006 173/162.1 |
| 5,697,456 A * | 12/1997 | Radle | ................... | B25D 17/043 173/162.2 |
| 5,774,993 A * | 7/1998 | Schlessmann | ......... | A01G 3/062 30/276 |
| 5,855,069 A * | 1/1999 | Matsubayashi | ...... | A01D 34/905 30/276 |
| 6,745,475 B1 * | 6/2004 | Trumpf | ................ | A01D 34/902 30/276 |
| 6,799,642 B2 * | 10/2004 | Wolf | ....................... | F16F 1/128 173/162.1 |
| 7,357,380 B2 * | 4/2008 | Menzel | ..................... | F16F 1/06 267/179 |
| 7,878,490 B2 | 2/2011 | Hartmann et al. | | |
| 7,882,596 B2 * | 2/2011 | Hixon | .................... | A01B 1/026 16/426 |
| 7,891,099 B2 * | 2/2011 | Wenckel | ................. | F16F 15/04 30/276 |
| 8,015,713 B2 * | 9/2011 | Wied | .................... | A01D 34/416 30/276 |
| 8,667,648 B2 * | 3/2014 | Vierck | ................. | A01D 34/416 16/426 |
| 2002/0004989 A1 * | 1/2002 | Schweigert | .......... | A01D 34/902 30/277.4 |
| 2002/0104221 A1 * | 8/2002 | Warashina | ........... | A01D 34/905 30/276 |
| 2003/0199327 A1 | 10/2003 | Sasaki et al. | | |
| 2007/0044321 A1 * | 3/2007 | Kocha | .................. | A01D 34/905 30/276 |
| 2010/0012338 A1 * | 1/2010 | Okabe | .................. | A01D 34/824 173/162.2 |
| 2012/0048581 A1 * | 3/2012 | Yamada | ............... | A01D 34/824 173/162.2 |
| 2012/0048582 A1 * | 3/2012 | Yamada | ............... | A01D 34/905 173/162.2 |
| 2012/0204428 A1 * | 8/2012 | Yang | .................... | A01D 34/905 30/276 |
| 2012/0246943 A1 * | 10/2012 | Yuasa | .................. | A01D 34/905 30/276 |
| 2013/0247386 A1 * | 9/2013 | Ishikawa | ................ | A01D 34/90 30/296.1 |
| 2013/0276314 A1 * | 10/2013 | Fukunaga | .......... | A01D 34/4165 30/276 |

FOREIGN PATENT DOCUMENTS

| | | |
|---|---|---|
| JP | S56-150321 U | 11/1981 |
| JP | H03-099919 U | 10/1991 |
| JP | H09-303354 A | 11/1997 |
| JP | 2003-310029 A | 11/2003 |
| JP | 2005-046087 A | 2/2005 |
| JP | 2005-048643 A | 2/2005 |
| JP | 2011-254706 A | 12/2011 |
| JP | 2014-121283 A | 7/2014 |

OTHER PUBLICATIONS

May 15, 2018, International Search Report issued for related PCT application No. PCT/JP2018/013961.

May 15, 2018, International Search Opinion issued for related PCT application No. PCT/JP2018/013961.

* cited by examiner

BRUSH CUTTER

CROSS REFERENCE TO PRIOR APPLICATION

This application is a National Stage Patent Application of PCT International Patent Application No. PCT/JP2018/013961 (filed on Mar. 30, 2018) under 35 U.S.C. § 371, which is hereby incorporated by reference in its entirety.

TECHNICAL FIELD

The present invention relates to a brush cutter, and more particularly to a brush cutter having a vibration absorbing member.

BACKGROUND ART

In a recent year, a brush cutter is known, which is provided with a drive unit such as an engine, a working unit such as a cutting blade driven by power of the drive unit, a shaft which transmits the power of the drive unit, a tubular portion which is arranged between the drive unit and the working unit, and in which the shaft is inserted, and a handle which is supported by the tubular portion.

Some brush cutters of this type are configured so that vibration from the drive unit or the working unit is not easily transmitted to the handle. For example, Patent Document 1 discloses a brush cutter which suppresses vibration generated in the shaft by integrally attaching a resin bush to the shaft inside the tubular portion.

RELATED ART REFERENCE

Patent Document

Patent Document 1: JP-A 2003-310029

SUMMARY OF THE INVENTION

Problems to be Solved by the Invention

However, with the brush cutter disclosed in Patent Document 1. it is difficult to suppress the vibration transmitted from the drive unit or the working unit to the tubular portion from being transmitted to the handle.

The invention provides a brush cutter capable of suppressing vibration transmitted from a drive unit or a working unit to a tubular portion from being transmitted to a handle.

Means for Solving the Problems

The present invention provides a brush cutter which includes:
a drive unit;
a working unit which is driven by power of the drive unit:
a shaft which transmits the power of the drive unit to the working unit;
a tubular portion which is disposed between the drive unit and the working unit, and in which the shaft is inserted;
a floating box which has a handle support portion; and
a handle which is supported by the handle support portion,
wherein the brush cutter includes a vibration absorbing member which fits in a tubular portion side fitting portion provided in the tubular portion and fits in a box side fitting portion provided in the floating box,
wherein the vibration absorbing member includes:
an inner peripheral portion of which an inner peripheral surface abuts on the tubular portion side fitting portion;
an outer peripheral portion of which an outer peripheral surface abuts on the box side fitting portion;
a plurality of ribs which connect the inner peripheral portion and the outer peripheral portion; and
a pair of stopper portions protruding from the outer peripheral portion toward the inner peripheral portion and facing the inner peripheral portion via clearance portions,
wherein the pair of stopper portions are arranged at a position orthogonal to a vertical plane passing through a center of the handle support portion and a center of the shaft when viewed from an axial direction, and
wherein the plurality of ribs are arranged on both sides of the vertical plane at positions displaced from the vertical plane.

Advantageous Effects of the Invention

According to the present invention, since the floating box provided with the handle support portion and the tubular portion into which the shaft for transmitting the power of the drive unit to the working unit is inserted are fitted via the vibration absorbing member, the vibration transmitted from the drive unit or the working unit to the tubular portion can be suppressed from being transmitted to the handle.

MODES FOR CARRYING OUT THE INVENTION

An embodiment of a brush cutter of the present invention will be described below with reference to the accompanying drawings.

Brush Cutter

Figure 1:
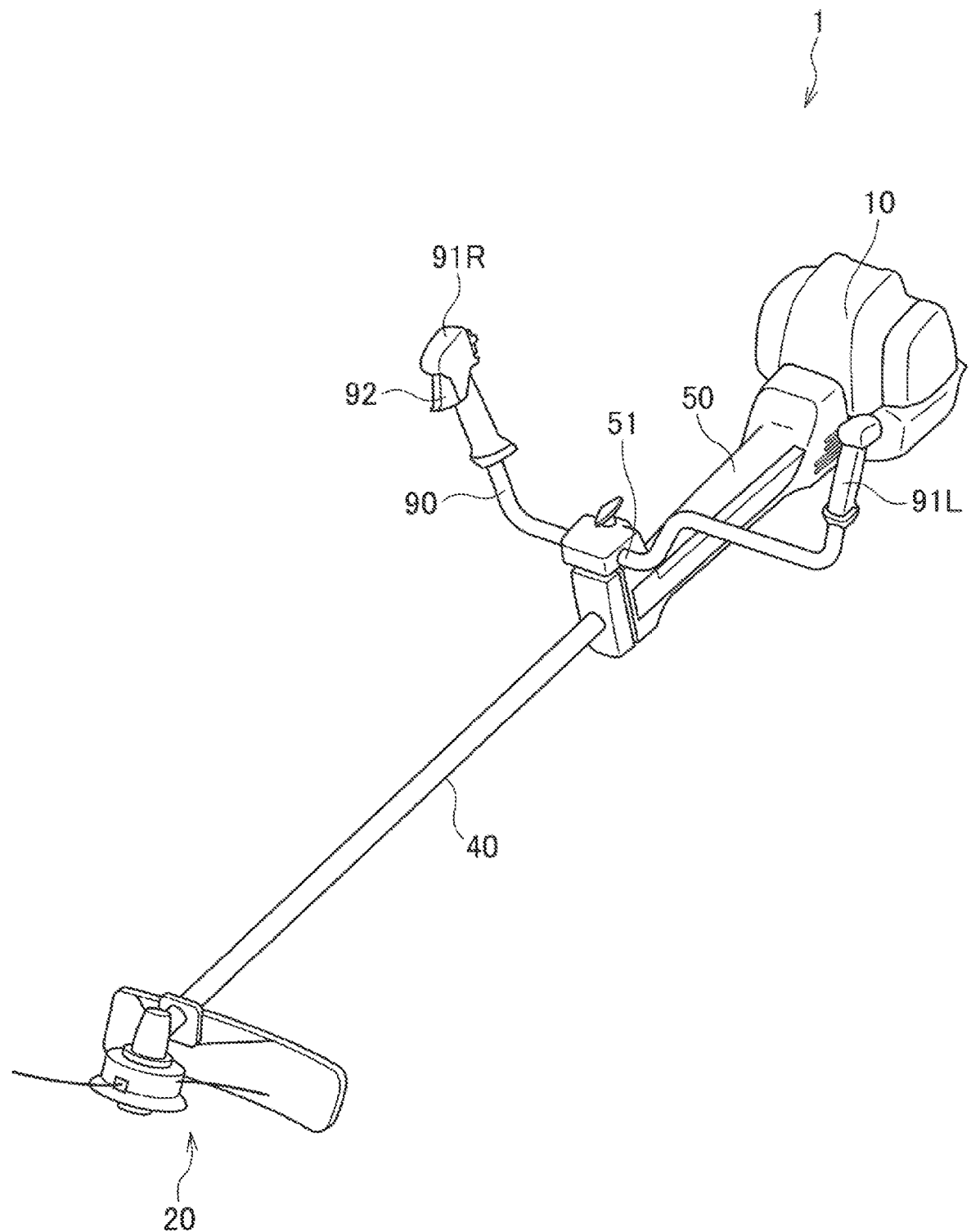
FIG. 1 is a perspective view of a brush cutter according to an embodiment of the invention as seen obliquely from above.
Figure 2:
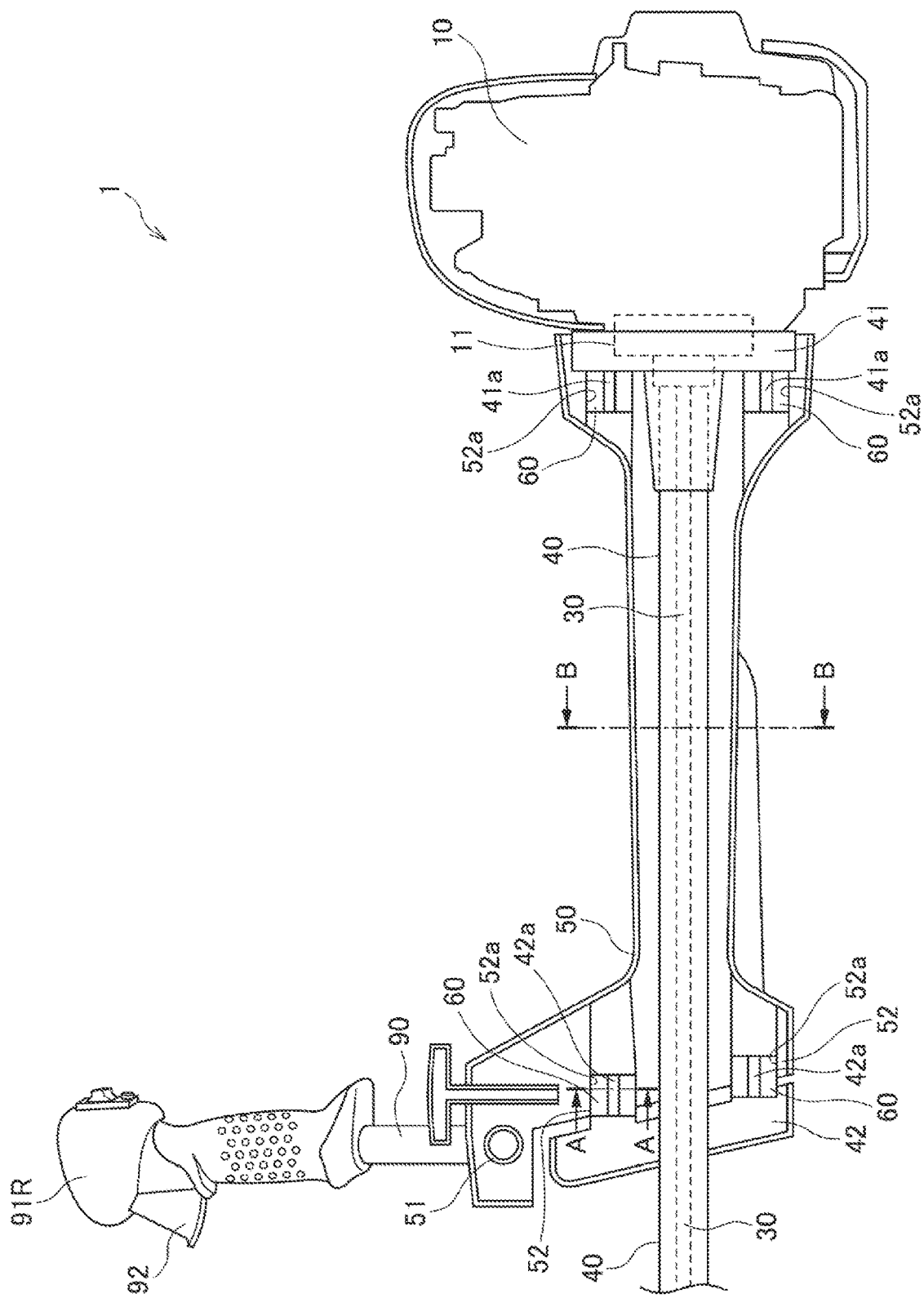
FIG. 2 is a side view of an inside of a floating box in the brush cutter of FIG. 1, as seen from a direction orthogonal to an axis.

As illustrated in FIGS. 1 and 2, a brush cutter 1 includes a drive unit 10, a working unit 20 driven by the power of the drive unit 10, a shaft 30 for transmitting the power of the drive unit 10 to the working unit 20, a tubular portion 40 disposed between the drive unit 10 and the working unit 20 and having the shaft 30 inserted therein, a floating box 50 having a handle support portion 51, and a handle 90 supported by the handle support portion 51.

The drive source of the drive unit 10 may be, for example, an internal combustion engine, but is not particularly limited. Further, as the working unit 20, for example, a rotary cutting blade can be used, but it is not particularly limited. The handle 90 is provided with grips 91L and 91R that an operator grips at the time of work and one (grip 91R in the illustrated example) is provided with a throttle lever 92 which adjusts the power of the drive unit 10.

The power from the drive unit 10 is transmitted by connecting a clutch 11 to an output shaft of the drive unit 10 and the power transmitted to the clutch 11 is transmitted to the working unit 20 via the shaft 30 (see FIG. 2) provided inside the tubular portion 40.

In the following, unless otherwise specified, in order to simplify and clarify the explanation, the working unit 20 side will be referred to as a tip end side and the drive unit 10 side will be referred to as a base end side and further the side where the handle support portion 51 is provided will be referred to as an upper side and the opposite side will be referred to as a lower side.

As illustrated in FIG. 2, a first holding portion 41 is provided at a base-end-side end portion of the tubular portion 40, that is, at the drive unit 10 side end portion. The first holding portion 41 is connected to the drive unit 10, covers the clutch 11, and is provided so as to surround the outer periphery of the tubular portion 40. Further, the first holding portion 41 is provided with pin-shaped tubular portion side fitting portions 41a extending parallel to the shaft 30 toward the tip end side, above and below the shaft 30.

A second holding portion 42 is provided from the base-end-side end portion of the tubular portion 40 to about ⅓ of the length of the tubular portion 40 in an axial direction to the tip end side. The second holding portion 42 is provided so as to surround the outer periphery of the tubular portion 40. Further, the second holding portion 42 is provided with pin-shaped tubular portion side fitting portions 42a extending parallel to the shaft 30 toward the base end side, above and below the shaft 30.

The floating box 50 is arranged so that both ends are interposed between the first holding portion 41 and the second holding portion 42. The handle support portion 51 is provided on the top of the tip-end-side (second holding portion 42 side) end portion of the floating box 50 and the handle 90 is supported by the handle support portion 51. Further, the floating box 50 is provided with four hole-shaped box side fitting portions 52 extending in parallel to the shaft 30 above and below the shaft 30 at both ends in the axial direction of the floating box 50.

Further, the box side fitting portion 52 has a tapered shape such that an inner peripheral surface 52a has a smaller vertical distance from both axial ends of the floating box 50 toward the center when viewed from a direction orthogonal to the shaft 30.

The outer circumferences of the tubular portion side fitting portion 41a and the tubular portion side fitting portion 42a are fitted with vibration absorbing members 60 and the outer circumference of the vibration absorbing member 60 is fitted with the box side fitting portion 52. Therefore, the floating box 50 is supported by the first holding portion 41 and the second holding portion 42 provided in the tubular portion 40 via the vibration absorbing members 60.

As a result, the floating box 50 provided with the handle support portion 51 and the tubular portion 40 into which the shaft 30 for transmitting the power of the drive unit 10 to the working unit 20 is inserted are fitted via the vibration absorbing member 60. Therefore, the vibration transmitted from the drive unit 10 or the working unit 20 to the tubular portion 40 can be suppressed from being transmitted to the handle 90.

Vibration Absorbing Member

Figure 3:
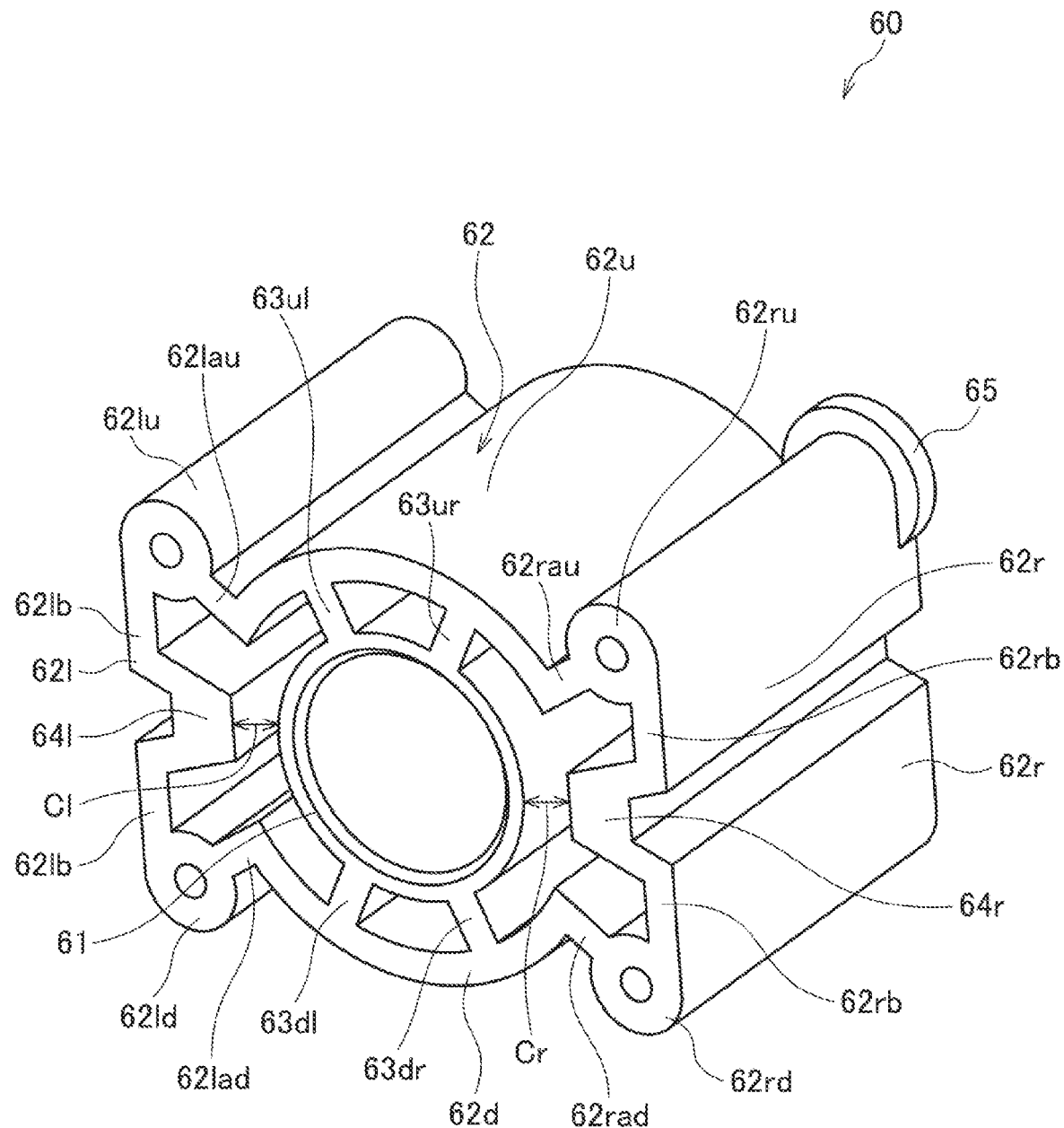
FIG. 3 is a perspective view of a vibration absorbing member according to the embodiment of the invention as seen obliquely from above.

As illustrated in FIG. 3, the vibration absorbing member 60 includes an inner peripheral portion 61, an outer peripheral portion 62, two upper ribs 63*ul* and 63*ur* connecting the inner peripheral portion 61 and the outer peripheral portion 62, and two lower ribs 63*dl* and 63*dr*. The vibration absorbing member 60 is made of an elastic material and may be made of rubber, for example, but is not particularly limited.

The inner peripheral portion 61 has an annular shape. The outer peripheral portion 62 includes an upper arc portion 62*u* and a lower arc portion 62*d* which have an arc shape concentric with the inner peripheral portion 61, a left connecting portion 62*l* for connecting the left side of the upper arc portion 62*u* and the left side of the lower arc portion 62*d*, and a right connecting portion 62*r* for connecting the right side of the upper arc portion 62*u* and the right side of the lower arc portion 62*d*.

The left connecting portion 62*l* includes an upper left annular portion 62*lu* and a lower left annular portion 62*ld* which have central axis parallel to the central axis of the inner peripheral portion 61, an upper left arc connecting portion 62*lau* connecting the upper left annular portion 62*lu* and the left side of the upper arc portion 62*u*, a lower left arc connecting portion 62*lad* connecting the lower left annular portion 62*ld* and the left side of the lower arc portion 62*d*, and a left vertical connecting portion 62*lb* for connecting the upper left annular portion 62*lu* and the lower left annular portion 62*ld*. Furthermore, the left vertical connecting portion 62*lb* is provided with a left stopper portion 64*l* protruding toward the inner peripheral portion 61.

The right connecting portion 62*r* includes an upper right annular portion 62*ru* and a lower right annular portion 62*rd* which have central axis parallel to the central axis of the inner peripheral portion 61, an upper right arc connecting portion 62*rau* for connecting the upper right annular portion 62*ru* and the right sides of the upper arc portion 62*u*, a lower right arc connecting portion 62*rad* for connecting the lower right annular portion 62*rd* and the right side of the lower arc portion 62*d*, and a right vertical connecting portion 62*rb* for connecting the upper right annular portion 62*ru* and the lower right annular portion 62*rd*. Further, the right vertical connecting portion 62*rb* is provided with a right stopper portion 64*r* protruding toward the inner peripheral portion 61.

Further, the left stopper portion 64*l* and the right stopper portion 64*r* are provided at positions facing each other with a vertical plane passing through the center of the circle of the inner peripheral portion 61 interposed therebetween. Also, a clearance portion Cl is provided between the inner peripheral portion 61 and the left stopper portion 64*l* and a clearance portion Cr is provided between the inner peripheral portion 61 and the right stopper portion 64*r*.

The upper ribs 63*ul* and 63*ur* respectively connect the upper side of the center of the circle of the inner peripheral portion 61 and the upper arc portion 62*u* of the outer peripheral portion 62. The upper rib 63*ul* is provided on the left side of the vertical plane passing through the center of the circle of the inner peripheral portion 61 and the upper rib 63*ur* is provided on the right side of the vertical plane passing through the center of the circle of the inner peripheral portion 61. In addition, the upper rib 63*ul* and the upper rib 63*ur* are paired with each other with the vertical plane passing through the center of the circle of the inner peripheral portion 61 interposed therebetween.

The lower ribs 63*dl* and 63*dr* respectively connect the lower side of the center of the circle of the inner peripheral portion 61 and the lower arc portion 62*d* of the outer peripheral portion 62. The lower rib 63*dl* is provided on the left side of the vertical plane passing through the center of the circle of the inner peripheral portion 61 and the lower rib 63*dr* is provided on the right side of the vertical plane passing through the center of the circle of the inner peripheral portion 61. In addition, the lower rib 63*dl* and the lower rib 63*dr* are paired with each other with vertical plane passing through the center of the circle of the inner peripheral portion 61 interposed therebetween.

Further, the thicknesses of the left stopper portion 64*l* and the right stopper portion 64*r* are configured to be larger than that of the upper ribs 63*ul* and 63*ur* and the lower ribs 63*dl* and 63*dr*.

Further, the lower left annular portion 62*ld* and the upper right annular portion 62*ru* are provided with lip portions 65 on the end surfaces on one end side (back side in the drawing). The lip portions 65 each have a brim shape extending in an outer diameter direction of the center of the circle from the outer peripheral surfaces of the lower left annular portion 62*ld* and the upper right annular portion 62*ru*.

Figure 4:
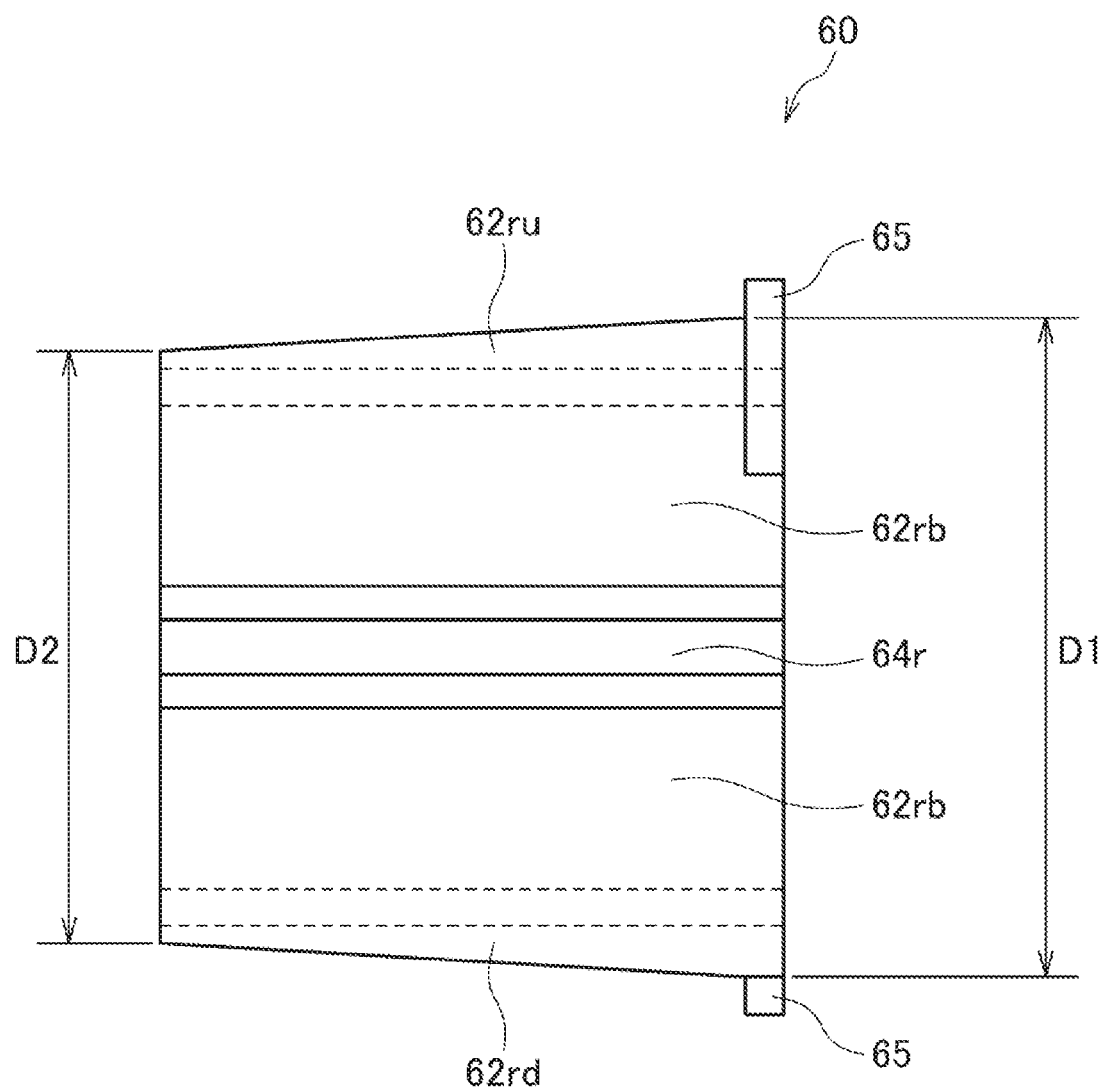
FIG. 4 is a right side view of the vibration absorbing member of FIG. 3.

As illustrated in FIG. 4, when viewed from a direction orthogonal to the annular center axis of the inner peripheral portion 61, the vibration absorbing member 60 has a tapered shape in which the vertical length is shortened from one end side (right side in the drawing) where the lip portion 65 is provided to the other end side (left side in the drawing). That is, the tapered shape is formed such that a vertical length D2 on the other end side is smaller than a vertical length D1 on the one end side.

Fitting Structure

Returning to FIG. 2, the vibration absorbing members 60 are fitted to the tubular portion side fitting portions 41*a* and 42*a* and the box side fitting portion 52 such that one end side where the lip portion 65 is provided becomes both end sides of the floating box 50, that is, the lip portion 65 comes in contact with the first holding portion 41 or the second holding portion 42.

In this case, the vibration absorbing member 60 is provided with the lip portion 65 on the end surface on the one end side. Thus, at the time of assembly, the direction in which the vibration absorbing members 60 are fitted to the tubular portion side fitting portions 41*a* and 42*a* and the box side fitting portion 52 can be easily visually recognized. Further, when the vibration absorbing members 60 are fitted in the tubular portion side fitting portions 41*a* and 42*a* in the wrong direction, the vibration absorbing member 60 cannot be inserted into the box side fitting portion 52 by the lip portion 65. Therefore, it is possible to prevent erroneous assembly during assembly.

Figure 5:
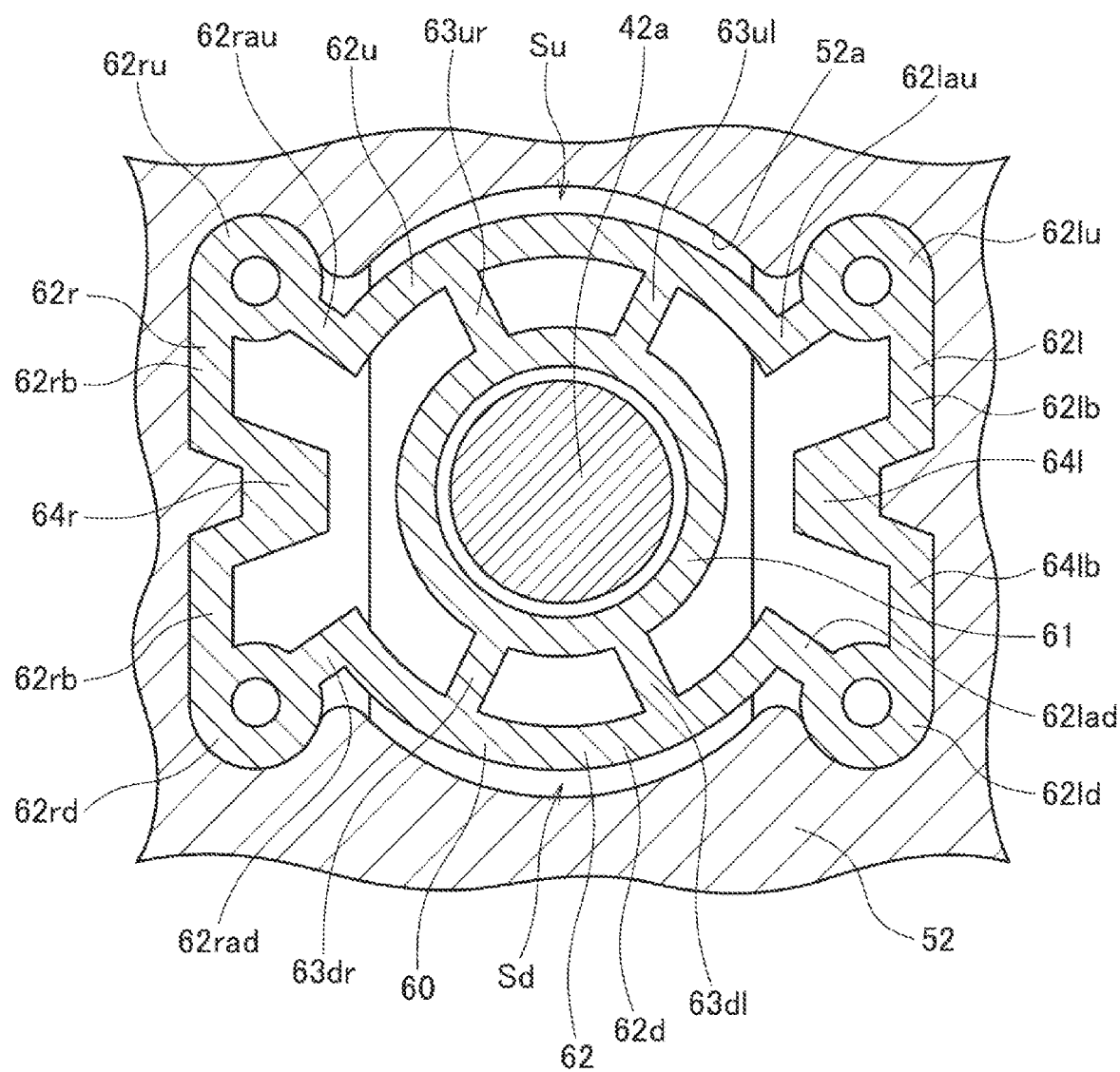
FIG. 5 is a cross-sectional view taken along the line A-A of FIG. 2.

As illustrated in FIG. 5, the vibration absorbing member 60 fits the inner peripheral portion 61 with the tubular portion side fitting portion 42*a* of the second holding portion 42. Further, the vibration absorbing member 60 is fitted and fixed to the box side fitting portion 52 by the left connecting portion 62*l* and the right connecting portion 62*r* of the outer peripheral portion 62 abutting on the inner peripheral surface 52*a* of the box side fitting portion 52. Specifically, the upper left annular portion 62*lu* of the outer peripheral portion 62, the lower left annular portion 62*ld*, the left vertical connecting portion 62*lb*, the left stopper portion 64*l*, and the upper right annular portion 62*ru*, the lower right annular portion 62*rd*, the right vertical connecting portion 62*rb*, and the right stopper portion 64*r* abut on the inner peripheral surface 52*a* of the box side fitting portion 52. Here, since the upper surfaces of the upper left annular portion 62*lu* and the upper right annular portion 62*ru*, and the lower surfaces of the lower left annular portion 62*ld* and the lower right annular portion 62*rd* also abut on the inner peripheral surface 52*a* of the box side fitting portion 52, the vibration absorbing member 60 is fixed vertically and horizontally.

As a result, when an operator holds the handle 90 and shakes the brush cutter 1 left and right, if the vibration absorbing member 60 is deformed by a certain amount in the left-right direction by the tubular portion side fitting portion 42*a* of the second holding portion 42 abutting left and right on the inner peripheral portion 61 of the vibration absorbing member 60, the inner peripheral portion 61 abuts on the left stopper portion 64*l* and the right stopper portion 64*r* to restrict the deformation. As a result, it is possible to reduce the discomfort caused by the deformation of the vibration absorbing member 60 that an operator feels when the brush cutter 1 is swung left and right.

Also, since the upper ribs 63*ul* and 63*ur* and the lower ribs 63*dl* and 63*dr* are respectively arranged at positions displaced from the vertical plane passing through the center of the circle, the load of the vibration absorbing member 60 in a vertical plane directions can be dispersed to the plurality of ribs. Generally, when not in use, the brush cutter 1 is placed with the handle support portion 51 on top. In this case, by supporting gravity with a plurality of ribs, stress concentration on a specific portion of the vibration absorbing member 60 can be relaxed.

Also, an upper space portion Su and a lower space portion Sd are provided between the upper arc portion 62*u* and the lower arc portion 62*d* of the vibration absorbing member 60 and the inner peripheral surface 52*a* of the box side fitting portion 52.

Therefore, the outer peripheral portion 62 of the vibration absorbing member 60 is allowed to deform in a vertical direction. Thereby, the stress applied to the upper ribs 63*ul* and 63*ur* and the lower ribs 63*d* and 63*dr* can be reduced and the transmission of vibration to the handle 90 via the floating box 50 can be further reduced.

That is, the vibration absorbing member 60 is fitted and fixed to the box side fitting portion 52 at the left connecting portion 62*l* and the right connecting portion 62*r* and the upper arc portion 62*u* and the lower arc portion 62*d* and the upper ribs 63*ul* and 63*ur* and the lower ribs 63*dl* and 63*dr* are deformed to absorb the vibration.

Further, by increasing the thicknesses of the left stopper portion 64*l* and the right stopper portion 64*r* which restrict the deformation with respect to the upper ribs 63*ul* and 63*ur* and the lower ribs 63*dl* and 63*dr* which allow the deformation, vibration and impact can be appropriately dampened.

The box side fitting portion 52 has a tapered shape such that the inner peripheral surface 52*a* has a smaller vertical distance from both axial ends of the floating box 50 toward the center when viewed from a direction orthogonal to the shaft 30 and the vibration absorbing member 60 is also arranged in such a direction that the tapered shape becomes shorter in the vertical direction from both axial ends of the floating box 50 toward the center.

This facilitates fitting the vibration absorbing member 60 into the box side fitting portion 52 of the floating box 50 during assembly, thus improving productivity. Further, since the space between the inner peripheral surface 52*a* of the box side fitting portion 52 and the vibration absorbing member 60 can be made uniform, the vibration absorbing performance does not deteriorate.

Figure 6:
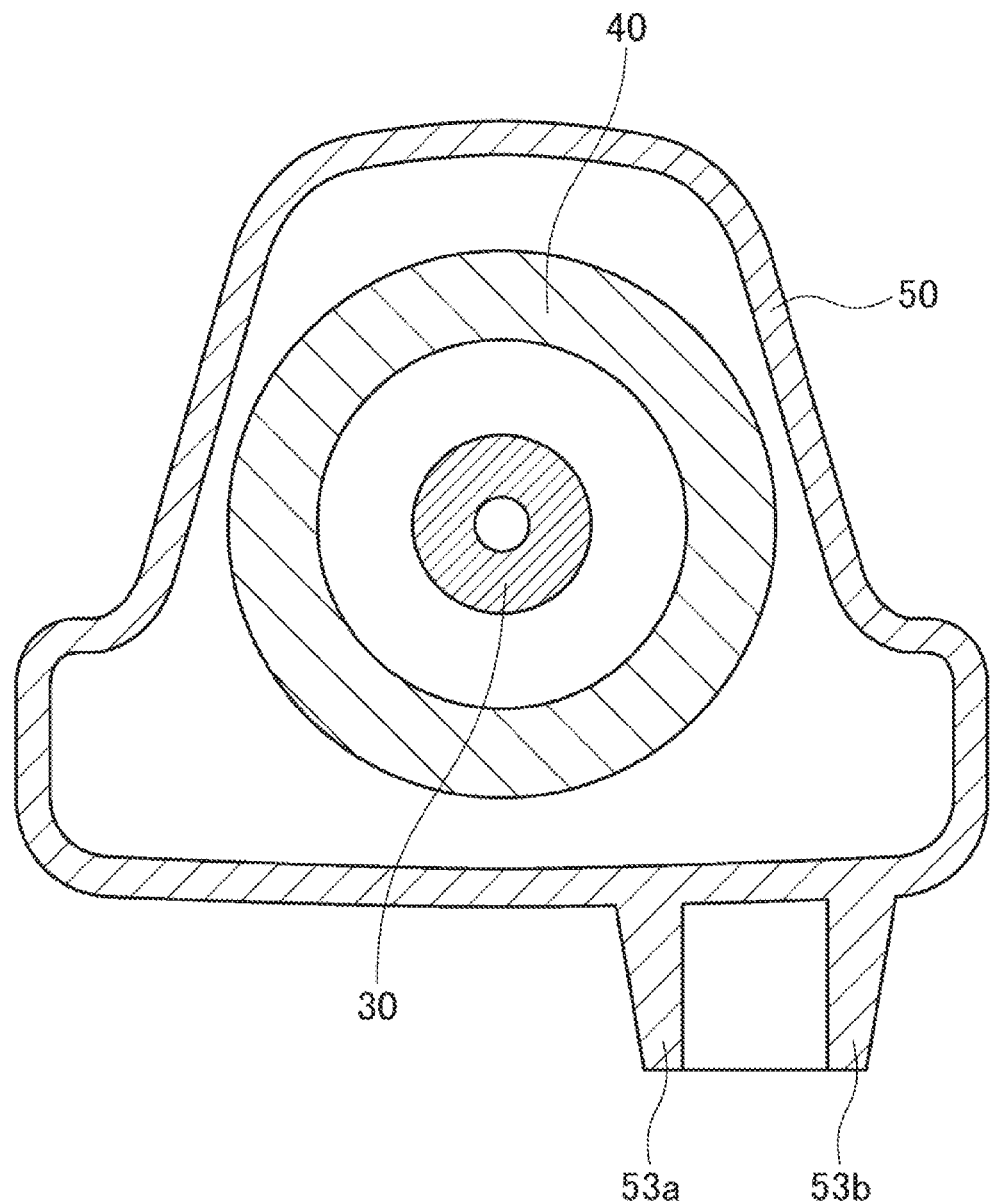
FIG. 6 is a cross-sectional view taken along the line B-B of FIG. 2.

As illustrated in FIG. 6, the floating box 50 has, on the side opposite to the handle support portion 51, two convex gripping portions 53*a* and 53*b* extending from the tip end side of the floating box 50 in the axial direction of the shaft 30.

As a result, an operator can grip the two gripping portions 53a and 53b with his/her hand and move while holding the brush cutter 1 except when working. As a result, the portability of the brush cutter 1 is improved.

The embodiment described above can be appropriately modified, improved, and the like. For example, in the embodiment, the lip portions 65 have brim shapes which respectively extend in an outer diameter direction of the center of the circle from the outer peripheral surfaces of the lower left annular portion 62ld and the upper right annular portion 62ru. However, the lip portion 65 may be just a protrusion. This simplifies the structure and facilitates manufacturing. Further, in the embodiment, the left vertical connecting portion 62lb and the right vertical connecting portion 62rb have a shape extending in the vertical direction. However, the vertical connecting portion may have a "C" shape in which the center part in the vertical direction is bent into the inner peripheral portion 61 side or may have an inverted "C" shape. By doing so, the inner peripheral surface 52a of the box side fitting portion 52 also has the same shape, so that the vibration absorbing member 60 can suppress displacement due to vibration.

In addition, at least the following matters are described in the present specification. Although the constituent elements and the like corresponding to those of the embodiment described above are shown in parentheses, the present invention is not limited to this.

(1) A brush cutter (brush cutter 1) which includes a drive unit (drive unit 10), a working unit (working unit 20) which is driven by power of the drive unit, a shaft (shaft 30) which transmits the power of the drive unit to the working unit, a tubular portion (tubular portion 40) which is disposed between the drive unit and the working unit, and in which the shaft is inserted, a floating box (floating box 50) which has a handle support portion (handle support portion 51), and a handle (handle 90) which is supported by the handle support portion, where the brush cutter includes a vibration absorbing member (vibration absorbing member 60) which fits in a tubular portion side fitting portion (tubular portion side fitting portions 41a, 42a) provided in the tubular portion and fits in a box side fitting portion (box side fitting portion 52) provided in the floating box, the vibration absorbing member includes, an inner peripheral portion (inner peripheral portion 61) of which an inner peripheral surface abuts on the tubular portion side fitting portion, an outer peripheral portion (outer peripheral portion 62) of which an outer peripheral surface abuts on the box side fitting portion, a plurality of ribs (upper ribs 63ul, 63ur, lower ribs 63dl, 63dr) which connect the inner peripheral portion and the outer peripheral portion, and a pair of stopper portions (left stopper portion 64l, right stopper portion 64r) protruding from the outer peripheral portion toward the inner peripheral portion and facing the inner peripheral portion via clearance portions (clearance portions Cl, Cr), the pair of stopper portions are arranged at a position orthogonal to a vertical plane passing through a center of the handle support portion and a center of the shaft when viewed from an axial direction, and the plurality of ribs are arranged on both sides of the vertical plane at positions displaced from the vertical plane.

According to (1), since the floating box provided with the handle support portion and the tubular portion into which the shaft for transmitting the power of the drive unit to the working unit is inserted are fitted via the vibration absorbing member, the vibration transmitted from the drive unit or the working unit to the tubular portion can be suppressed from being transmitted to the handle.

Also, in the vibration absorbing member, a pair of stopper portions protruding from the outer peripheral portion toward the inner peripheral portion and facing the inner peripheral portion through the clearance portions are arranged at positions orthogonal to the vertical plane passing through the center of the handle support portion and the center of the shaft. Therefore, when an operator holds the handle and shakes the brush cutter to the left and right, if the vibration absorbing member deforms by a certain amount in the direction orthogonal to the vertical plane, the inner peripheral portion abuts on the stopper portion. As a result, the deformation is restricted. Therefore, when the brush cutter is shaken to the left and right, it is possible to reduce the discomfort of the operator due to the deformation of the vibration absorbing member.

Further, since the plurality of ribs are arranged on both sides of the vertical plane at positions displaced from the vertical plane, the load of the vibration absorbing member in the vertical plane direction can be distributed to the plurality of ribs. Generally, the brush cutter is placed with the handle support portion on top when not in use, but by supporting gravity with a plurality of ribs at this time, stress concentration on a specific part of the vibration absorbing member can be relaxed.

(2) The brush cutter according to (1), where the plurality of ribs include, a pair of upper ribs (upper ribs 63ul, 63ur) provided above the center of the shaft in a state where the upper ribs interpose the vertical plane, and a pair of lower ribs (lower ribs 63dl, 63dr) provided below the center of the shaft in a state where the lower ribs interpose the vertical plane, the inner peripheral portion has an annular shape surrounding the tubular portion side fitting portion, the outer peripheral portion includes, an upper arc portion (upper arc portion 62u) connected to the pair of upper ribs, a lower arc portion (lower arc portion 62d) connected to the pair of lower ribs, one end side connecting portion (left connecting portion 62l) connecting one end side of the upper arc portion and one end side of the lower arc portion, and the other end side connecting portion (right connecting portion 62r) connecting the other end side of the upper arc portion and the other end side of the lower arc portion, the one end side connecting portion and the other end side connecting portion are fitted to the box side fitting portion, and the pair of stopper portions are provided at the one end side connecting portion and the other end side connecting portion.

According to (2), the vibration absorbing member is fitted and fixed to the box side fitting portion with the left connecting portion and the right connecting portion and can be deformed at the upper arc portion, the lower arc portion, the upper rib, and the lower rib to absorb the vibration.

(3) The brush cutter according to (1) or (2), where a thickness of the pair of stopper portions is larger than that of the plurality of ribs.

According to (3), vibration and impact can be appropriately damped by increasing the thickness of the pair of stopper portions which restrict the deformation with respect to the plurality of ribs which allow the deformation.

(4) A brush cutter (brush cutter 1) which includes a drive unit (drive unit 10), a working unit (working unit 20) which is driven by power of the drive unit, a shaft (shaft 30) which transmits the power of the drive unit to the working unit, a tubular portion (tubular portion 40) which is disposed between the drive unit and the working unit, and in which the shaft is inserted, a floating box (floating box 50) which has a handle support portion (handle support portion 51), and a handle (handle 90) which is supported by the handle support portion, where the brush cutter includes a vibration absorbing member (vibration absorbing member 60) which fits in a tubular portion side fitting portion (tubular portion side fitting portions 41a, 42a) provided in the tubular portion and fits in a box side fitting portion (box side fitting portion 52) provided in the floating box, and an inner peripheral surface (inner peripheral surface 52a) of the box side fitting portion and an outer peripheral surface of the vibration absorbing member both have a tapered shape when viewed from a direction orthogonal to the shaft.

According to (4) since the floating box with the handle support portion and the tubular portion into which the shaft for transmitting the power of the drive unit to the working unit is inserted are fitted together via the vibration absorbing member, the vibration transmitted from the drive unit or the working unit to the tubular portion can be suppressed from being transmitted to the handle.

Also, both the inner peripheral surface of the box side fitting portion and the outer peripheral surface of the vibration absorbing member have a tapered shape when viewed from the direction orthogonal to the shaft. Therefore, at the time of assembly, it becomes easy to fit the vibration absorbing member into the box side fitting portion. As a result, the productivity is improved. In addition, since the gap between the inner peripheral surface of the box side fitting portion and the vibration absorbing member can be made uniform, the vibration absorbing performance does not deteriorate.

(5) The brush cutter according to (4), where
the vibration absorbing member is provided with a lip portion (lip portion 65) on one end surface in an axial direction.

According to (5), the vibration absorbing member is provided with the lip portion on the end surface on the one end side. Therefore, at the time of assembly, the direction in which the vibration absorbing member is fitted to the tubular portion side fitting portion and the box side fitting portion can be easily visually recognized. Also, when the vibration absorbing member is fitted in the tubular portion side fitting portion in the wrong direction, the vibration absorbing member cannot be inserted into the box side fitting portion by the lip portion. Therefore, it is possible to prevent erroneous assembly during assembly.

(6) The brush cutter according to any one of (1) to (5), where
a predetermined space portion (upper space portion Su, lower space portion Sd) is provided between the box side fitting portion and the vibration absorbing member on the vertical plane passing through the center of the handle support portion and the center of the shaft.

According to (6), since the predetermined space portion is provided between the box side fitting portion and the vibration absorbing member on the vertical plane passing through the center of the handle support portion and the center of the shaft, the outer peripheral portion of the vibration absorbing member can be allowed to deform in the vertical plane direction. As a result, the stress applied to the plurality of ribs can be reduced and the vibration can be further reduced from being transmitted to the handle portion via the floating box.

(7) The brush cutter according to any one of (1) to (6), where
the floating box has a gripping portion (gripping portions 53a, 53b) extending in the axial direction on a side opposite to the handle support portion.

According to (7), an operator can move with holding the brush cutter while gripping the gripping portion with hand so as to straddle the gripping portion except when working. As a result, the portability of the brush cutter is improved.

DESCRIPTION OF REFERENCE NUMERALS AND SIGNS 1 brush cutter
10 drive unit
20 working unit
30 shaft
40 tubular portion
41a, 42a tubular portion side fitting portion
50 floating box
51 handle support portion
52 box side fitting portion
52a inner peripheral surface
53a, 53b convex gripping portion
60 vibration absorbing member
61 inner peripheral portion
62 outer peripheral portion
62u upper arc portion
62d lower arc portion
62l left connecting portion (one end side connecting portion)
62r right connecting portion (other end side connecting portion)
63ul, 63ur upper rib
63dl, 63dr lower rib
64l left stopper portion (a pair of stopper portions)
64r right stopper portion (a pair of stopper portions)
65 lip portion
90 handle
Cl, Cr clearance portion
Su upper space portion
Sd lower space portion

The invention claimed is:
1. A brush cutter comprising:
a drive unit;
a working unit which is driven by power of the drive unit;
a shaft which transmits the power of the drive unit to the working unit;
a tubular portion which is disposed between the drive unit and the working unit, and in which the shaft is inserted;
a floating box which has a handle support portion; and
a handle which is supported by the handle support portion,
wherein the brush cutter includes a vibration absorbing member which fits in a tubular portion side fitting portion provided in the tubular portion and fits in a box side fitting portion provided in the floating box,
wherein the vibration absorbing member includes:
an inner peripheral portion of which an inner peripheral surface abuts on the tubular portion side fitting portion;

an outer peripheral portion of which an outer peripheral surface abuts on the box side fitting portion;

a plurality of ribs which connect the inner peripheral portion and the outer peripheral portion; and a pair of stopper portions protruding from the outer peripheral portion toward the inner peripheral portion and facing the inner peripheral portion via clearance portions, wherein the pair of stopper portions are arranged at a position orthogonal to a vertical plane passing through a center of the handle support portion and a center of the shaft when viewed from an axial direction, and wherein the plurality of ribs are arranged on both sides of the vertical plane at positions displaced from the vertical plane.

2. The brush cutter according to claim 1, wherein the plurality of ribs include:

a pair of upper ribs provided above the center of the shaft in a state where the upper ribs interpose the vertical plane; and a pair of lower ribs provided below the center of the shaft in a state where the lower ribs interpose the vertical plane, wherein the inner peripheral portion has an annular shape surrounding the tubular portion side fitting portion, wherein the outer peripheral portion includes:

an upper arc portion connected to the pair of upper ribs;

a lower arc portion connected to the pair of lower ribs;

one end side connecting portion connecting one end side of the upper arc portion and one end side of the lower arc portion; and the other end side connecting portion connecting the other end side of the upper arc portion and the other end side of the lower arc portion, wherein the one end side connecting portion and the other end side connecting portion are fitted to the box side fitting portion, and wherein the pair of stopper portions are provided at the one end side connecting portion and the other end side connecting portion.

3. The brush cutter according to claim 1, wherein a thickness of the pair of stopper portions is larger than that of the plurality of ribs.

4. The brush cutter according to claim 1, wherein a predetermined space portion is provided between the box side fitting portion and the vibration absorbing member on the vertical plane passing through the center of the handle support portion and the center of the shaft.

5. The brush cutter according to claim 1, wherein the floating box has a gripping portion extending in the axial direction on a side opposite to the handle support portion.

6. The brush cutter according to claim 1, wherein the vibration absorbing member includes:

a first vibration absorbing member disposed at a first end on a drive unit side of the tubular portion and which fits in the tubular portion side fitting portion provided in the tubular portion; and a second vibration absorbing member disposed at a second end on a working unit side of the tubular portion and which fits in the box side fitting portion provided in the floating box, wherein an inner peripheral surface of the box side fitting portion and the outer peripheral surface of the vibration absorbing member both have a tapered shape when viewed from a direction orthogonal to the shaft, the tapered shape is formed such that a vertical length on a first end side is smaller than a vertical length on a second end side, and the inner peripheral surface of the box side fitting portion tapers along a central axis, and wherein the second vibration absorbing member is configured to include an upper left annular portion, a lower left annular portion, an upper right annular portion, and a lower right annular portion, each annular portion having a through hole along a central axis of the respective annular portion parallel to the central axis of the inner peripheral surface of the box side fitting portion.

7. The brush cutter according to claim 6, wherein the vibration absorbing members are each provided with a lip portion on one end surface in an axial direction.

8. The brush cutter according to claim 6, wherein a predetermined space portion is provided between the box side fitting portion and the second vibration absorbing member on the vertical plane passing through the center of the handle support portion and the center of the shaft.

9. The brush cutter according to claim 6, wherein the floating box has a gripping portion extending in the axial direction on a side opposite to the handle support portion.

* * * * *